(12) United States Patent
Davis et al.

(10) Patent No.: US 7,951,354 B2
(45) Date of Patent: May 31, 2011

(54) OZONATING MANGANESE DIOXIDE

(75) Inventors: Stuart M. Davis, Norfolk, MA (US);
Gary A. Miller, Milton, MA (US)

(73) Assignee: The Gillette Company, Boston, MA (US)

( * ) Notice: Subject to any disclaimer, the term of this patent is extended or adjusted under 35 U.S.C. 154(b) by 527 days.

(21) Appl. No.: 12/061,136

(22) Filed: Apr. 2, 2008

(65) Prior Publication Data

US 2009/0249614 A1    Oct. 8, 2009

(51) Int. Cl.
*C01G 45/00* (2006.01)

(52) U.S. Cl. .................. 423/605; 423/265; 429/224

(58) Field of Classification Search .................. 423/605, 423/265; 429/224
See application file for complete search history.

(56) References Cited

U.S. PATENT DOCUMENTS

| 4,006,217 | A | * | 2/1977 | Faber et al. .................... 423/605 |
| 5,277,890 | A | * | 1/1994 | Wang et al. .................... 423/605 |
| 5,698,315 | A | | 12/1997 | Hayashi et al. |
| 5,919,598 | A | | 7/1999 | Flaim et al. |
| 5,997,775 | A | | 12/1999 | Hayashi et al. |
| 6,162,561 | A | | 12/2000 | Wang et al. |
| 6,585,881 | B2 | | 7/2003 | Davis et al. |
| 2002/0134964 | A1 | | 9/2002 | Christian et al. |
| 2005/0164089 | A1 | | 7/2005 | Iltchev et al. |
| 2007/0009799 | A1 | | 1/2007 | Zheng |

FOREIGN PATENT DOCUMENTS

| JP | 6-3021225 | 1/1988 |
| JP | 11-25970 | 1/1999 |

* cited by examiner

*Primary Examiner* — Steven Bos
(74) *Attorney, Agent, or Firm* — Fish & Richardson P.C.

(57) ABSTRACT

Ozonated manganese dioxide is prepared by an ozonation process and utilized as a cathode active material. An ozone containing gas stream contacts manganese dioxide and produces ozonated manganese dioxide with high efficiency. After preparation, ozonated manganese dioxide is stored for a limited time at a low temperature and incorporated into a cathode active material for alkaline batteries.

17 Claims, 2 Drawing Sheets

OZONATING MANGANESE DIOXIDE

TECHNICAL FIELD

This invention relates to batteries.

BACKGROUND

Batteries are commonly used as electrical energy sources. A battery contains a negative electrode, typically called the anode, and a positive electrode, typically called the cathode. The anode contains an active material that can be oxidized. The cathode contains or consumes an active material that can be reduced. The anode active material is capable of reducing the cathode active material. The battery contains an ionically conductive electrolyte which permeates the anode and cathode and also occupies the space between these two electrodes. The electrolyte normally includes a solution consisting of a solvent and a dissolved ionic substance. The battery also includes a separator material disposed between the anode and the cathode which electronically insulates the anode from the cathode but is permeable to the electrolyte solution and its ions.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

There is a growing need for batteries suitable for high power application. Modern electronic devices such as cellular phones, digital cameras and toys, flash units, remote control toys, camcorders and high intensity lamps are examples of such high power applications. Such devices require high current drain rates of between about 0.5 and 2 Amp, typically between about 0.5 and 1.5 Amp. Correspondingly, they require operation at power demands between about 0.5 and 2 Watt.

SUMMARY

Generally, the invention relates to oxidizing, for example, ozonating manganese dioxide to provide high quality cathode material of a battery. The invention also relates to a cathode mixture including ozonated manganese dioxide and to electrochemical cells including a cathode mixture that includes ozonated manganese dioxide.

In one aspect, the invention features a method of preparing ozonated manganese dioxide. The method includes contacting manganese dioxide with an ozone containing gas stream having an ozone concentration of at most 20 g/std m$^3$. The ozone concentration can be, for example, between 5 g/std m$^3$ and 15 g/std m$^3$.

In another aspect, the invention features a method that prepares ozonated electrolytic manganese dioxide at a reaction efficiency of at least 30%, for example, at least 35%, based on the quantity of ozone supplied.

In another aspect, the invention features a method of making a cathode mixture. The method includes combining ozonated manganese dioxide that has been prepared by an ozonation process, with carbon and an electrolyte within 48 hours, for example, 24 hours, after the ozonation process.

In another aspect, the invention features a method of making a cathode mixture. The method includes storing ozonated manganese dioxide that is prepared by an ozonation process, below 25° C., for example, between −10° C. and 20° C. The method also includes after storage, combining the ozonated manganese dioxide with graphite and an electrolyte.

In another aspect, the invention features a method of making an electrochemical cell. The method includes incorporating ozonated manganese dioxide in a cathode, incorporating the cathode into an electrochemical cell to provide an open circuit voltage of greater than 1.65 V, and heating the electrochemical cell at a temperature of at least 30° C., for example, at least 50° C., so that the open circuit voltage of the electrochemical cell is lowered to 1.65 V or less. The electrochemical cell can be heated, for example, for between 0.1 hour and 168 hours. Before being heated, the electrochemical cell can have an open circuit voltage, for example, of at least 1.70 V or at least 1.80 V.

Embodiments may include one or more of the following features. The manganese dioxide can have a porosity of 0.035 cm$^3$/g to about 0.180 cm$^3$/g and a surface area of about 20 m$^2$/g to about 100 m$^2$/g. The ozonated manganese dioxide can have an average valence value, for example, greater than 3.98 or greater than 4.00.

All publications, patent applications, patents, and other references mentioned herein are incorporated by reference herein in their entirety.

Other features and advantages of the invention will be apparent from the following detailed description, and from the claims.

DETAILED DESCRIPTION

Figure 1:
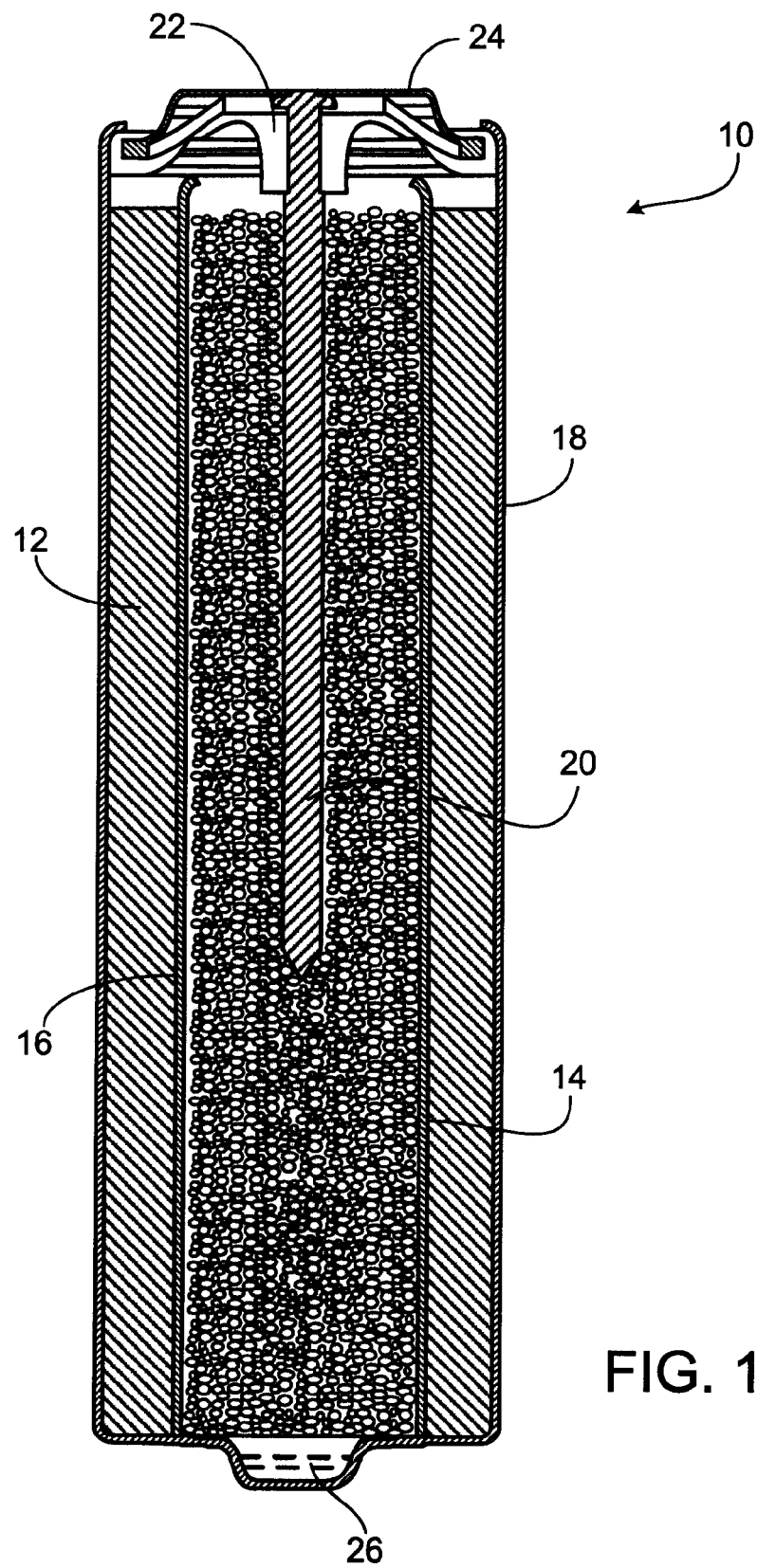
FIG. 1 is a schematic diagram of a battery.

Referring to FIG. 1, battery 10 includes a cathode 12, an anode 14, a separator 16 and a cylindrical housing 18. Battery 10 also includes current collector 20, seal 22, and a negative metal end cap 24, which serves as the negative terminal for the battery. A positive pip 26, which serves the positive terminal of the battery, is at the opposite end of the battery from the negative terminal. An electrolytic solution is dispersed throughout battery 10. Battery 10 can be an alkaline battery, for example, a AA, AAA, AAAA, C, or D battery.

Cathode 12 includes one or more cathode active materials. It may also include carbon particles, a binder, and other additives.

Examples of cathode active material include manganese dioxide, nickel oxyhydroxide, iron disulfide, silver oxide, or copper oxide.

Manganese dioxide used in cathode 12 generally has a purity of at least about 90 percent by weight. Electrolytic manganese dioxide (EMD) is a preferred form of manganese dioxide for electrochemical cells because of its high density and since it is conveniently obtained at high purity by electrolytic methods. Chemical manganese dioxide (CMD) is an alternative form of manganese dioxide.

EMD can be manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process", a chemical process disclosed by U.S. Pat. No. 2,956,860 (Welsh) for the manufacture of battery grade MnO$_2$ by employing the reaction mixture of $MnSO_4$ and an alkali metal chlorate, preferably $NaClO_3$. Distributors of manganese dioxides include Tronox (Trona D), Chem-Metals Co., Tosoh, Delta Manganese, Mitsui Chemicals, JMC, and Xiangtan.

However, manganese dioxide is actually a non stoichiometric material more accurately written as $Mn^{+4}_{1-x-y}Mn^{+3}_yV_xO_{2-4x-y}(OH^-)_{4x-y}$, where V stands for a vacancy in the cationic lattice and the $OH^-$ group indicates the hydroxyl defects present in the anionic lattice in association with $Mn^{+3}$. The non-stoichiometry is due to the presence of $Mn^{+4}$ vacancies (missing $Mn^{+4}$ ions replaced by 4 protons) and hydroxyl groups which results in $Mn^{+3}$ defects for the sake of charge neutrality. In some embodiments, manganese dioxide includes about 6 wt % of MnOOH. Because of these $Mn^{+4}$ and $Mn^{+3}$ defects and presence of protons and hydroxyl groups associated therewith, the formula for conventional battery grade manganese dioxide, whether in the form of EMD or CMD, is more accurately represented by the overall formula $MnO_x$, $1.950<x<1.970$. The formula $MnO_x$, as used herein, is understood to be an overall representation of the above complex formula.

The value x is also called the "degree of peroxidation". It is related to the average valence of manganese in the $MnO_x$, which can be expressed as 2x. Thus, if the overall formula is $MnO_{1.92}$ the average valence of manganese is +3.84, assuming a valence of −2 for oxygen, and if the formula is $MnO_{1.96}$ the average valence of manganese is +3.92. The term average valence, as used herein, is intended to be a simple arithmetic average, that is, the sum of the valence of each manganese atom in the manganese dioxide sample divided by the total number of manganese atoms.

The value x of $MnO_x$ can be determined by standard titration procedures. For example, methods of analysis of Mn weight percentage (wt % Mn) and $MnO_2$ weight percentage (wt % $MnO_2$) in battery grade $MnO_x$ is provided in "Handbook of Manganese Dioxides Battery Grade", edited by D. Glover, B. Schumm, Jr. and A. Kozawa, and Published by the IBA, Inc. 1989, pgs. 25-46. With the knowledge of wt % Mn and wt % $MnO_2$, the value x in $MnO_x$ can be calculated as follows:

$x=1+[\text{wt \% } MnO_2]/[(1.5825)(\text{wt \% Mn})]$.

In some embodiments, $MnO_x$ samples are dried at 110-115° C. prior to running the analyses, to remove physisorbed water. This drying procedure can promote decomposition of the $MnO_x$ and lower the value x. In some embodiments, the samples are analyzed without being pre-dried. The % Mn and % $MnO_2$ are determined using the same samples prepared and analyzed under the same conditions. In some embodiments, a single sample can be used for the simultaneous determination of % Mn and % $MnO_2$.

Without being bound by theory, it is believed that an electrochemical cell containing manganese dioxide having a higher average valence, or "x" value, has better cell performance. For example, such electrochemical cell can have a high open circuit voltage (OCV) and a higher discharge capacity expressed as mAh/g of $MnO_2$ or as $mAh/cm^3$ of $MnO_2$. Because of these properties the cell will exhibit a higher average operating voltage, a longer discharge duration, and superior high current drain capacity. An ozonation process that raises the "x" value will be described in more detail later.

Manganese dioxide included in cathode 12 is highly porous. In particular, EMD can have a porosity, for example, of about 0.035 $cm^3/g$ to about 0.060 $cm^3/g$, and CMD can have a porosity, for example, of about 0.035 $cm^3/g$ to about 0.180 $cm^3/g$. Porosity, as used herein, is the total volume of void in one gram of material. The large porosity allows the manganese dioxide to have a large surface area. Typically, one gram of EMD can have a surface area, for example, of about 20 $m^2/g$ to about 50 $m^2/g$, e.g., about 35 $m^2/g$, and one gram of CMD can have a surface area, for example, up to about 100 $m^2/g$.

The carbon particles used in cathode 12 may be graphite particles, carbon black, or their combination. The graphite can be synthetic graphite including an expanded graphite, natural graphite including an expanded natural graphite, or a blend thereof. Suitable natural graphite particles can be obtained from, for example, Brazilian Nacional de Grafite (Itapecerica, MG Brazil, NdG MP-0702x grade) or Superior Graphite Co. (Chicago, Ill., ABG-grade). Suitable expanded graphite particles can be obtained, for example, from Chuetsu Graphite Works, Ltd. (Chuetsu grades WH-20A and WH-20AF) of Japan or Timcal America (Westlake, Ohio, BNB-Grade).

Examples of binders include polyethylene, polyacrylic acid, or a fluorocarbon resin, such as PVDF or PTFE. An example of a polyethylene binder is sold under the trade name COATHYLENE HA-1681 (available from Hoechst or DuPont).

Examples of other additives are described in, for example, U.S. Pat. Nos. 5,698,315, 5,919,598, and 5,997,775 and U.S. application Ser. No. 10/765,569, now U.S. Pat. No. 7,351,499.

An electrolyte solution can be dispersed through cathode 12. The electrolyte can be an aqueous solution of alkali hydroxide, such as potassium hydroxide or sodium hydroxide. The electrolyte can also be an aqueous solution of saline electrolyte, such as zinc chloride, ammonium chloride, magnesium perchlorate, magnesium bromide, or their combinations.

Anode 14 can be formed of an anode active material, a gelling agent, and minor amounts of additives, such as gassing inhibitor. In addition, a portion of the electrolyte solution discussed above is dispersed throughout the anode. Examples of the anode active material include zinc, tin, iron, magnesium, and aluminum. Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. A gassing inhibitor can include an inorganic material, such as bismuth, tin, indium, their salts, or their oxides. Alternatively, a gassing inhibitor can include an organic compound, such as a phosphate ester, an ionic surfactant or a nonionic surfactant, a quaternary ammonium salt or a polymeric quaternary ammonium compound.

Separator 16 can be a conventional alkaline battery separator. In other embodiments, separator 16 can include a layer of cellophane combined with a layer of non-woven material. The separator also can include an additional layer of non-woven material. Housing 18 can be a conventional housing commonly used in primary alkaline batteries, for example, nickel plated cold-rolled steel. Current collector 20 can be made from a suitable metal, such as brass. Seal 22 can be made, for example, of a nylon.

To increase the average valence of manganese in manganese dioxide $MnO_x$ and thus achieve an improved cell performance, ozonated manganese dioxide is prepared using an ozonation process, in which EMD or CMD is treated with an ozone containing gas stream.

Figure 2A:
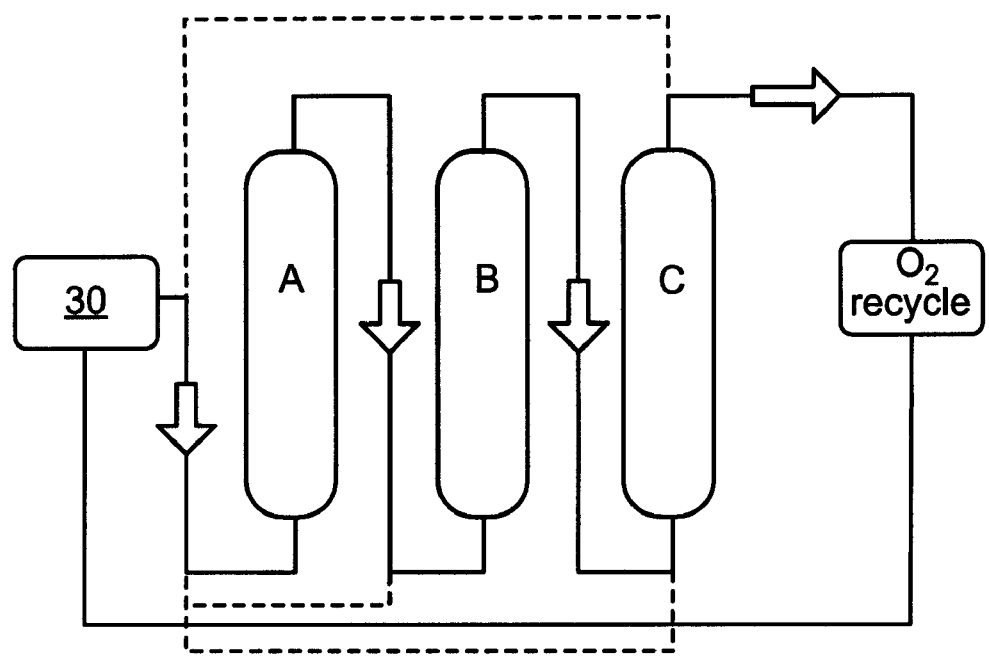
FIG. 2 is an exemplary ozonation process.
Like reference symbols in the various drawings indicate like elements.

Referring to FIG. 2A, ozone generator 30 generates an ozone containing gas stream. The gas stream is directed through static columns A, B, and C that contain $MnO_x$ powder to be ozonated. The $MnO_x$ powder is agitated by the passage of the gas stream (from bottom to top) or by mechanical means, to assure good contact of all portions of the powder with the ozone. The ozonation process is arranged in a counter current mode where the freshest ozone in the gas stream enters reactor A and encounters the most completely ozonated $MnO_x$ (e.g. $MnO_{1.995}$), then passes to reactor B where the partially exhausted ozone gas stream encounters partially ozonated $MnO_x$ (e.g. $MnO_{1.980}$) and finally the mostly exhausted ozone gas stream passes to reactor C where it encounters the freshest $MnO_x$ (e.g. $MnO_{1.965}$). When the contents of reactor A are fully ozonated (e.g. $MnO_{2.000}$ is obtained), the process is interrupted and the contents of reactor A are discharged. Reactor A is filled with fresh, un-ozonated $MnO_x$ (e.g. $MnO_{1.960}$). By application of valves the ozone gas stream is now directed to flow first through reactor B, next through reactor C and then through reactor A so that the fresh ozone gas stream always contacts the most completely ozonated $MnO_x$ material first and the least ozonated $MnO_x$ material last. Due to the low $MnO_x$ level in the last reactor (i.e. fresh $MnO_x$) and a partially exhausted ozone stream at this point, reaction efficiency is high and almost all remaining ozone is consumed at this step. Very little ozone exits the last reactor to be recycled to the ozone generator 30 or to be vented to atmosphere through a suitable ozone destroying catalytic reactor. Therefore a high ozone utilization efficiency is achieved.

Figure 2B:
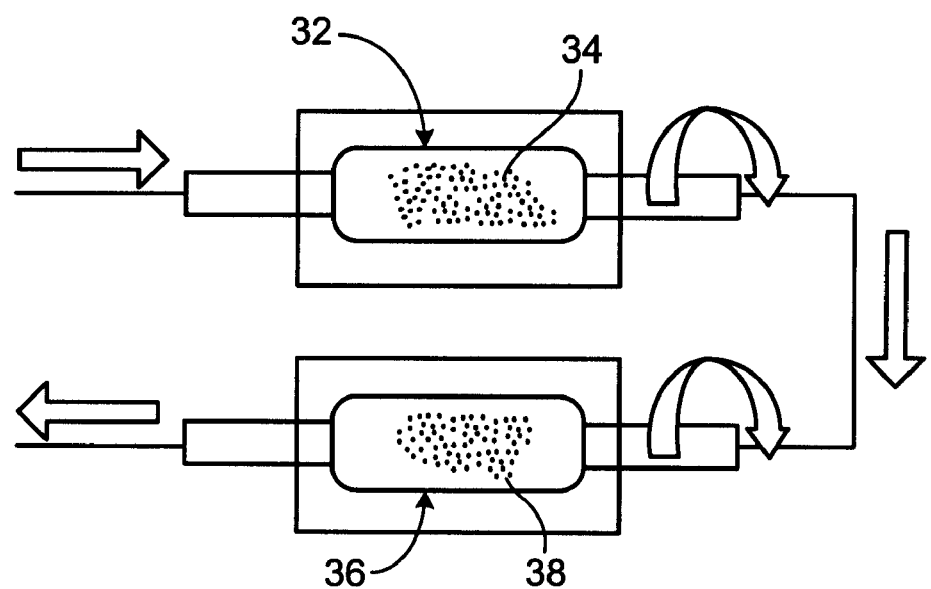

Referring to FIG. 2B, an alternate scheme based on rotating reactors is shown. The rotational action replaces the agitation scheme mentioned in connection with the static column reactors A, B, and C shown in 2A.

The gas stream is first directed into a reactor 32 that contains previously ozonated $MnO_x$ 34 taken from reactor 36. The gas stream contacts the surface area of $MnO_x$ 34 and the ozone in the gas stream ozonates $MnO_x$ 34. The residual gas stream from reactor 32 is further directed into reactor 36 that contains fresh $MnO_x$ 38 and the ozone in the gas stream ozonates $MnO_x$ 38. Finally, the gas stream is directed back to the ozone generator 30 to be recycled or is directed to atmosphere through a catalytic ozone destroying reactor (so called "ozone killer").

During the processes represented in FIGS. 2A and 2B, the temperature in reactors A, B and C or reactors 32 and 36 are kept at about room temperature, and the pressure in reactors is kept at about one standard atmosphere (14.7 psia) or just slightly above, so as to provide a sufficient pressure gradient between reactor inlet and outlet to insure adequate gas flow.

The ozonation reaction involves oxidation of the MnOOH (normally around 6 wt %) contained in the starting EMD or CMD according to the following equation (1), in which the valence of manganese increases from +3 to +4:

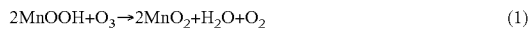

$$2MnOOH+O_3 \rightarrow 2MnO_2+H_2O+O_2 \qquad (1)$$

This oxidation reaction is exothermic. For example, about 40 Kcal of heat is librated when one mole of MnOOH is oxidized to $MnO_2$.

In some embodiments, reactors A, B and C are equipped with screws, paddles, or vibrators to agitate the CMD or EMD during the ozonation process. In other embodiments, reactors A, B and C are fed bursts of gas which momentarily to agitate the CMD or EMD ($MnO_x$). In yet other embodiments, reactors 32 or 36 rotate or tumble to agitate the $MnO_x$. Agitation of CMD or EMD can increase the surface contact of the powder material with ozone and thus facilitate the oxidation of the CMD or EMD.

In another variation, the reactors may consist of "static mixers" through which the CMD or EMD powder is allowed to fall as ozone containing gas flows in a counter current (upwards) direction. The "static mixers" may be vertical or inclined. The "static mixers" may be truly static or they may be rotated or oscillated to induce greater flow.

Although we have mentioned only $MnO_x$ powder up to this point, it is understood that the ozonation process can be applied to other physical forms of $MnO_x$. For example to small chunks of $MnO_x$, particularly chunks of EMD that have a diameter of 1 inch or smaller, for example, ¼ inch or smaller. Such material can be ground after the ozonation process to produce a $MnO_x$ powder suitable for use in electrochemical cells.

It is also envisioned that the ozonation process can be performed in a liquid suspension of $MnO_x$ chunks or powder. The agitation of the $MnO_x$ in a liquid requires less energy than is required to agitate a dry powder. Contact of the ozone and $MnO_x$ is also promoted by the dissolution of ozone gas in the liquid medium from where it can diffuse or flow to the $MnO_x$ surface or even enter the pores of the $MnO_x$. The liquid medium can be aqueous or non-aqueous. Other chemical reagents may be present or dissolved in the liquid medium to facilitate or catalyze the reaction. For example, an aqueous medium can be acid, basic or neutral. It may contain dissolved salts. The dissolved salts can contain oxidizable species which are capable of transferring the oxidizing capacity of the ozone to the $MnO_x$ by shuttle reactions. For example, at a moderate pH around 4-6 the dissolved salt may be a sulfate which can be oxidized by ozone to a persulfate. The persulfate may then oxidize the $MnO_x$ to a higher oxidation state and in turn be reduced by the $MnO_x$ back to sulfate. This sulfate is then oxidized again to persulfate by the ozone in a continuing loop. Another oxidizable species would be cerium, which forms a soluble sulfate. This can be cycled between $Ce^{+2}$ and $Ce^{+4}$ by ozone oxidation and subsequent reduction by $MnO_x$. The $MnO_x$ is further oxidized in the process.

The ozonation also involves an undesired side reaction in which ozone decomposes into oxygen according to equation (2):

$$2O_3 \rightarrow 3O_2 \qquad (2)$$

The decomposition rate of ozone increases at higher temperatures. For example, the decomposition rate is up to about four times higher when the temperature increases from room temperature, e.g., about 21° C., to about 45° C., and is up to about eight times higher when the temperature increases from room temperature to about 70° C.

The existence of the side reaction consumes ozone and lowers the efficiency of the ozonation process realized through the reaction described by equation (1). Efficiency, as used herein, is the amount of ozone (e.g., in units of grams or moles) that participates in the ozonation reaction described by equation (1) divided by the total amount of ozone used to treat manganese dioxide, expressed as a percentage. To increase the efficiency of the ozonation process, it is desirable to suppress the decomposition reaction described by equation (2).

A gas stream with low ozone concentration can be provided to treat manganese dioxide. Concentration, as used herein, is the total grams of a ozone gas within one cubic meter of the gas stream under standard conditions (0° C. and 14.7 psi). The gas stream includes ozone and other gases, such as oxygen and/or nitrogen. In some embodiments, the gas stream has an ozone concentration, e.g., of at least about 1 g/std m³, 5 g/std m³, or 8 g/std m³, and/or up to, e.g., about 12 g/std m³, 15 g/std m³, or 20 g/std m³. In particular embodiments, the gas stream has an ozone concentration of about 10.5 g/std m³. The low ozone concentration can provide a large average distance between ozone molecules in the gas stream or ozone molecules adsorbed on the $MnO_x$ surface and thereby reduce the possibility of ozone decomposition described by equation (2).

In some embodiments, only one reactor, for example, reactor 32 is included in the process. In such embodiments, after passing reactor 32, the gas stream directed back to ozone generator 30 directly or is vented directly to atmosphere, through an "ozone killer". In some embodiments, more than two, for example, three, four, or more reactors, are connected serially so that the ozone gas in the gas stream is fully utilized before being recycled to the ozone generator or before venting to the atmosphere. The gas stream entering the later reactors has a lower ozone concentration and can further reduce the ozone decomposition rate and therefore increase the efficiency of ozonation in that particular reactor.

In some embodiments, the gas stream has a high flow rate. Flow rate, as used herein, is under standard conditions, the total volume of a gas stream flowed into a reactor within an hour per kilogram of manganese dioxide in the same reactor. For example, the flow rate of the gas stream is, e.g., about 1.0 std m$^3$/hr per Kg EMD, 2.0 std m$^3$/hr per Kg EMD, or 4.0 std m$^3$/hr per Kg EMD, and/or up to about 10.0 std m$^3$/hr per Kg EMD. The high flow rate can provide a large amount of ozone needed for ozonating EMD and allows direct contact of ozone with the large surface area of EMD, quickly and uniformly. The high flow rate can also facilitate decreasing the temperature in the reactors by carrying away the librated heat with the gas flow at high speed and therefore decrease the decomposition rate of ozone as described by equation (2).

In some typical embodiments, one kilogram of EMD is treated for about 3.0 hours under the ozone concentration and gas stream flow rates described above. The selection of ozone concentration and gas stream flow rate are balanced to allow ozonation of a large amount of EMD within a relatively short period of time at a relatively low reaction temperature, e.g., about room temperature.

The reactors may be cooled by an external bath of cold liquid or gas to prevent the decomposition of ozone. In particular embodiments, the reactors A, B and C or reactors 32 and 34 are jacketed with a cold fluid that circulates in the jacket.

The ozonation process has a high efficiency, for example, of at least 30%, or 40% and/or up to, e.g., 50%, 60%, 70%, 80%, or 90%.

Ozonation is deemed "complete" when the value x in $MnO_x$ reaches at least 1.995. Typically, an "x" value of 2.000 can be achieved according to the conditions mentioned above.

OEMD can be combined with carbon and an electrolyte to provide cathode 12. In some embodiments, before combining with carbon and the electrolyte, OEMD is stored at a temperature, for example, lower than 25° C., 20° C., 15° C., 10° C., 5° C., or 0° C. The low temperature storage can prevent decomposition or reduce the decomposition rate of OEMD to EMD. In some embodiments, OEMD is combined with carbon and the electrolyte within 48 hours, for example, within 36 hours, 24 hours, or 12 hours. In some embodiments, OEMD is combined with carbon and the electrolyte after 0.25 hours. Combining OEMD with carbon and the electrolyte within a short period of time can also help prevent decomposition or reduce the decomposition rate of OEMD to EMD. In some embodiments, OEMD is combined with carbon and the electrolyte in a blender, with the electrolyte being added at a slow rate over a long period of time to allow heat to dissipate. Further, the electrolyte solution can be pre-cooled before it is added into the blender. In some embodiments, the blender includes a jacket to cool the blender.

The combined OEMD, carbon, and the electrolyte can be incorporated into battery 10. In some embodiments, the fresh made battery 10 that includes OEMD has an OCV, for example, of larger than 1.65 V, 1.70 V, 1.75 V, 1.80 V, 1.85 V, or 1.90 V.

The OCV drops at a slow rate upon aging of the cell. The American National Standards Institute requirements for dry cell batteries states that the maximum OCV for an alkaline-manganese dry cell is no larger than 1.65 V. To meet this standard, manufacturing of battery 10 further includes heating battery 10 at a temperature, for example, of at least 30° C., 40° C., 50° C., 60° C., 80° C., or 100° C. In some embodiments, battery 10 can be heated in an oven. In other embodiments, battery 10 can be heated by induction heating, hot air or gas. In some embodiments, battery 10 is heated for at least about 0.1 hour, 1 hours, 10 hours, or 100 hours, and/or up to, e.g., about 168 hours. In some embodiments, battery 10 is heated for a shorter period of time when a higher heating temperature is applied. Battery 10 can obtain an OCV of less than 1.65 within controlled time without significantly sacrificing cell performance.

In some embodiments, other strong oxidants besides ozone can be employed to increase the average valence of manganese in manganese dioxide. Examples of the oxidants are $KO_2$, $KO_3$, $KMnO_4$, various persulfates, such as $K_2S_2O_8$ and $Na_2S_2O_8$, peroxy disulfuric acid $H_2S_2O_8$, and peroxy monosulfuric acid $H_2SO_5$ and its salts, such as $K_2SO_5$ and $Na_2SO_5$.

To use these oxidants for oxidizing $MnO_x$, EMD powder is slurried in water, to which oxidants are added with stirring at elevated temperature. In some embodiments, when the oxidants include persulfate, the exhausted oxidant can be recycled using, for example, ozone.

In some embodiments, a supplementary electrolytic oxidation can be employed to increase the average valence of manganese in manganese dioxide (increase the value x in $MnO_x$). Commercial EMD plating is normally carried out in a mixed bath of MnSO4+H2SO4 at 2V-3V over a period of several weeks. The plated EMD is then stripped, crushed, washed, neutralized, ground, and dried in a controlled manner. Typically the final $MnO_x$ index is 1.96 to 1.97.

To achieve a larger "x" value, a supplementary electrolytic oxidation process is employed. Commercial EMD powder is suspended in an agitated bath of an inert alkaline electrolyte, such as a bath of potassium or sodium hydroxide. Two electrodes made, for example, of platinum and/or ruthenized platinum, are immersed in the bath and are separated by a porous diaphragm, creating two compartments. The suspended EMD is contained in the anode compartment. The other compartment contains only electrolyte and the cathode electrode. A Voltage which is higher than that conventionally employed in EMD production (2V-3V), e.g. of about 4V-5V, is applied, to further oxidize the EMD powder at the anode (positive electrode), while hydrogen gas is produced at the cathode (negative electrode). A Voltage which is higher than that conventionally employed in EMD production (2V-3V), e.g. of about 4V-5V, is applied, to further oxidize the EMD powder at one of the two electrodes when hydrogen gas is produced at the other one of the two electrodes. The oxidized EMD powder is quickly removed, superficially rinsed and dried. It is then combined with carbon and KOH electrolyte as described above, to provide a cathode and be used in a battery. By working in an alkaline bath and progressing rapidly from the oxidation step through rinsing, drying and blending, a high x value can be preserved, similar to that for ozonated EMD. Washing and drying may be superficial and incomplete to avoid heating the product and reduce the value "x".

EXAMPLE

In this illustrative example, a AA battery including OEMD is made and tested under various storage conditions. Testing results are compared with those of a conventional AA battery that includes ordinary EMD.

750 grams of EMD powder are placed in a reactor connected to a motor that rotates the reactor. An ozone generator generates a gas stream that contains oxygen and ozone having an ozone concentration of about 10.5 g/std $m^3$ and a flow rate of about 1.0 std $m^3$/hr at 14.7 psia and room temperature. The gas stream is fed into the reactor for about 180 minutes. OEMD is thereby produced and blended with graphite and potassium hydroxide to provide a cathode material mixture. The cathode material mixture is incorporated, e.g., into a AA battery and performs well. The cell balance, void volume, and construction procedures of the battery are similar to those for commercial alkaline batteries.

The AA battery is tested on a standard device test.

In the test, a freshly prepared AA battery is discharged according to the ANSI toy test on a 3.9 Ohm load for 1 hour/day until it falls to a closed circuit voltage of 0.8 V. The AA battery gives 2.796 Watt-hours.

Still with reference to the ANSI toy test, after preparation, an AA battery is stored at 60° C. for a week and then discharged on the toy test. Before reaching an closed circuit voltage of 0.8 V, the AA battery gives 2.666 Watt-hours.

Other embodiments are in the following claims.

What is claimed is:

1. A method of ozonating manganese dioxide, the method comprising:
   contacting manganese dioxide that includes MnOOH with an ozone containing gas stream having an ozone concentration of at most 20 g/std $m^3$, the ozone oxidizing the MnOOH to manganese dioxide.

2. The method of claim 1, wherein the gas stream has an ozone concentration of at least 1 g/std $m^3$.

3. The method of claim 1, wherein the gas stream has an ozone concentration of at most 15 g/std $m^3$.

4. The method of claim 1, wherein the gas stream has an ozone concentration of about 10.5 g/std $m^3$.

5. The method of claim 1, wherein the gas stream has an ozone concentration of about 5 g/std $m^3$ to about 15 g/std $m^3$.

6. The method of claim 1, wherein the gas stream has an ozone concentration of about 8 g/std $m^3$ to about 12 g/std $m^3$.

7. The method of claim 1, wherein manganese in the ozonated manganese dioxide has an average valence value greater than 3.98.

8. The method of claim 1, wherein the manganese dioxide including MnOOH comprises electrolytic manganese dioxide.

9. The method of claim 8, wherein at least 30% of the ozone provided in the gas stream is consumed in the oxidation of the MnOOH to manganese dioxide.

10. The method of claim 1, wherein the manganese dioxide including MnOOH comprises chemical manganese dioxide.

11. The method of claim 1, wherein the manganese dioxide before ozonation has a surface area of about 20 to 100 $m^2$/g.

12. The method of claim 1, wherein the manganese dioxide before ozonation has a porosity of about 0.035 $cm^3$/g to about 0.180 $cm^3$/g.

13. The method of claim 1, wherein the gas stream has a flow rate of about 1.24 std $m^3$/hr per kg of manganese dioxide.

14. A method comprising ozonating electrolytic manganese dioxide including MnOOH by contacting the electrolytic manganese dioxide including the MnOOH with an ozone containing gas stream, wherein the ozone oxidizes the MnOOH to manganese dioxide, and wherein at least 30% of the ozone in the gas stream is consumed in the oxidation of the MnOOH to manganese dioxide.

15. The method of claim 14, wherein about 40% of the ozone in the gas stream is consumed in the oxidation of the MnOOH to manganese dioxide.

16. The method of claim 14, wherein the gas stream has a flow rate of about 1.24 std $m^3$/hr per kg of electrolytic manganese dioxide before ozonation.

17. The method of claim 1, wherein the gas stream has an ozone concentration of about 5 g/std $m^3$ to about 15 g/std $m^3$ and at least 30% of the ozone provided in the gas stream is consumed in the oxidation of the MnOOH to manganese dioxide providing ozonated manganese dioxide.

* * * * *